(12) United States Patent
Chian

(10) Patent No.: US 6,920,377 B2
(45) Date of Patent: Jul. 19, 2005

(54) SELF-SUSTAINING CONTROL FOR A HEATING SYSTEM

(75) Inventor: Brent Chian, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 176 days.

(21) Appl. No.: 10/628,802

(22) Filed: Jul. 28, 2003

(65) Prior Publication Data

US 2005/0038566 A1 Feb. 17, 2005

(51) Int. Cl.⁷ .......................... G01M 1/38; G05B 13/00; G05B 15/00; G05B 21/00; G05D 23/00
(52) U.S. Cl. ..................... 700/278; 700/12; 700/21; 700/75; 700/79; 700/274; 700/299; 431/6; 431/16; 431/42; 431/60; 431/80; 236/1 A; 236/1 H; 236/26 A
(58) Field of Search ..................... 700/11, 12, 21, 700/23, 75, 79, 278, 274–276, 299, 300; 110/185, 186; 136/217; 137/66, 78.4, 335; 236/1 A, 1 H, 26 A; 431/2, 6, 14, 16, 42, 60, 79, 80

(56) References Cited

U.S. PATENT DOCUMENTS

| | | | | |
|---|---|---|---|---|
| 4,035,134 A | * | 7/1977 | Matthews | 431/21 |
| 4,131,413 A | * | 12/1978 | Ryno | 431/44 |
| 4,231,732 A | * | 11/1980 | Newport et al. | 431/46 |
| 4,242,078 A | * | 12/1980 | Nelson et al. | 431/45 |
| 4,508,261 A | * | 4/1985 | Blank | 236/20 R |
| 4,778,378 A | * | 10/1988 | Dolnick et al. | 431/79 |
| 4,984,981 A | * | 1/1991 | Pottebaum | 431/80 |

* cited by examiner

*Primary Examiner*—Anthony Knight
*Assistant Examiner*—Crystal J Barnes
(74) *Attorney, Agent, or Firm*—McDonnell Boehnen Hulbert & Berghoff LLP

(57) ABSTRACT

A self-sustaining control for a heating system, having conventional operational modes and pilot burner assembly, is disclosed. A controller directs operation in accordance with a need-based protocol and monitors the condition of a storage device, which provides system power during the stand-by or off mode under normal conditions. A thermoelectric device is in thermal communication with the pilot burner assembly and powers the system whenever the pilot is lit. Regardless of heat need, the controller directs operation in a pilot-on mode, in lieu of an off mode, whenever the storage device is compromised.

5 Claims, 1 Drawing Sheet

SELF-SUSTAINING CONTROL FOR A HEATING SYSTEM

BACKGROUND OF THE INVENTION

The present invention relates generally to a heating system and, more particularly, to a control, powered by a storage device and a thermoelectric assembly, to ensure operation of the heating system whenever the storage device is compromised, i.e., a self-sustaining control, and to enhance efficiency.

Gas-powered heating systems are well known. (As used herein, the term "gas-powered" refers to use of natural gas, propane or any other fossil fuel as the fuel source.) Such heating systems are operable in three conventional modes—the stand-by or "OFF" mode, the heating or "ON" mode and the intermediate or "PILOT-ON" mode.

For areas where electricity is unavailable, the heating system lacks an energy source for ignition of the pilot burner assembly whenever there is a demand for heating. As such, the heating system is designed to operate in the "PILOT-ON" mode in the absence of a heating demand and in the "ON" mode in the presence of a heating demand. That is, once the pilot burner assembly is manually lit as a part of the start-up procedure, the pilot burner assembly burns continuously, significantly diminishing system efficiency.

SUMMARY OF THE INVENTION

In a principal aspect, the present invention is a control for a heating system, operable in the three conventional modes—the "OFF" mode, the "ON" mode and the "PILOT-ON" mode. As is well known in the art, such a heating system includes a pilot burner assembly.

The control includes a controller, directing the operational mode of the heating system in accordance with a need-based protocol, a storage device and a thermo-electric assembly. In the absence of a heating demand, the controller places the heating in the "OFF" mode. In response to a heating demand, the controller interconnects the pilot burner assembly and storage device to initiate the PILOT-ON mode, and the storage device powers ignition of the pilot burner assembly. The thermo-electric assembly responsively provides a potential that powers the heating system and controller during operation in the PILOT-ON and ON modes.

The controller monitors the condition of the storage device. When that condition is compromised, the controller maintains the PILOT-ON mode, in lieu of the OFF mode, such that the heating system remains operational despite the compromised state of the storage device.

It is thus an object of the present invention to provide an efficient, self-sustaining heating system. Another object is gas-powered heating system with a self-sustaining control. Still another object of the present invention is a self-sustaining control for a heating system, whereby the overall efficiency of the heating system is improved. It is yet another object to provide a heating system, powered by a storage device, wherein operation is ensured regardless of the temporary expiration of the storage device.

These and other features, objects and advantages of the present invention are described or apparent in the following detailed description.

BRIEF DESCRIPTION OF THE DRAWINGS

Preferred embodiments of the present invention are described herein with reference to the drawings wherein.

DETAILED DESCRIPTION OF PREFERRED EMBODIMENTS

Figure 1:
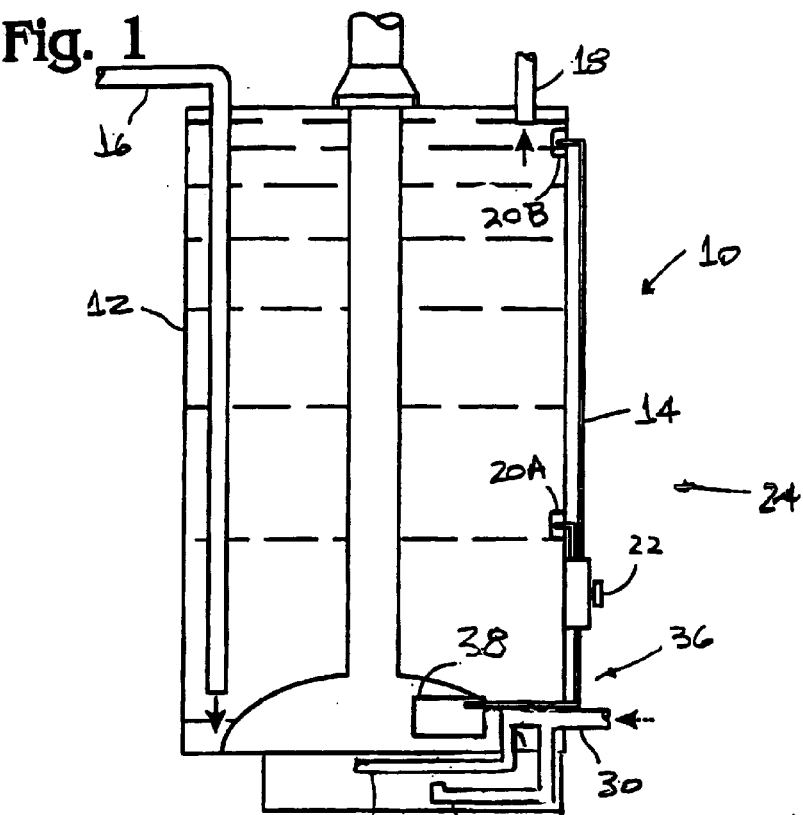
FIG. 1 is a schematic illustration of a water heater and a first preferred embodiment of the present invention.
Figure 2:
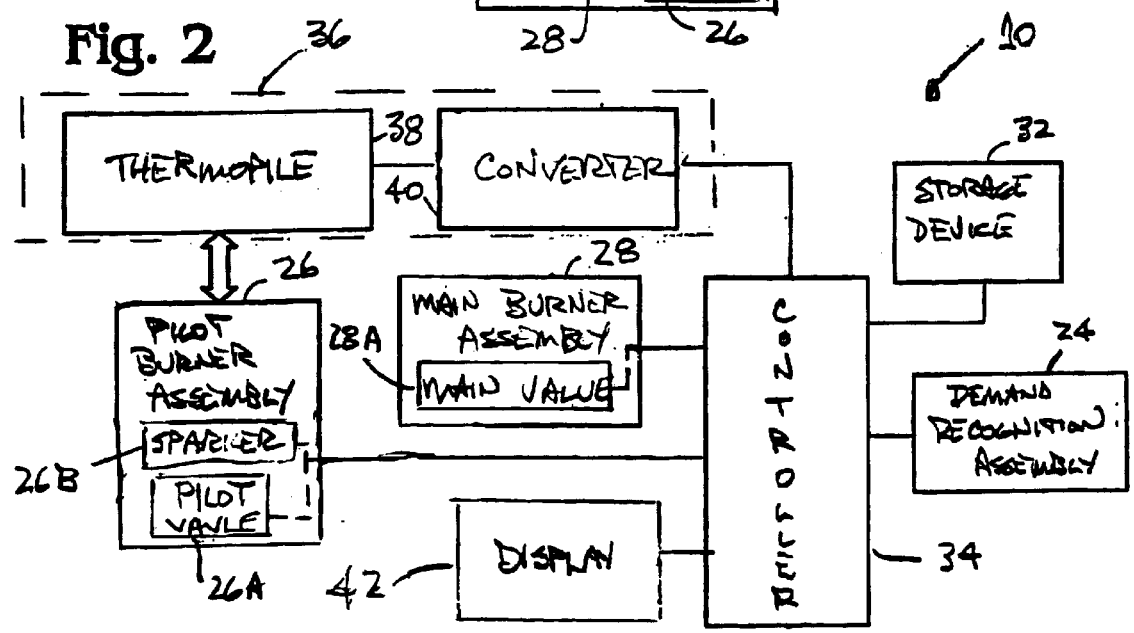
FIG. 2 is a functional block diagram of the various embodiments of the present invention.

A first preferred embodiment of the present invention is shown in FIGS. 1 and 2 as a self-sustaining control, generally designated 10, for a gas-powered water heater 12. It is to be understood, however, that the control 10 is equally adaptable to other heating systems, such as a furnace or fireplace insert. (As used herein, the term "heating system" includes all such heating systems.)

The water heater 12 is conventional and includes a tank 14, water inlet 16 and outlet 18. Conventional sensors 20A, 20B and adjustable temperature selector 22 monitor water temperature in the tank 14 and cooperate in a conventional manner to define a demand recognition assembly 24 for providing a demand signal whenever that temperature falls below the set point, established by the selector 22. The water heater 12 further includes a pilot burner assembly 26, having a pilot valve 26A and a sparker 26B, and a main burner assembly 28, having main valve 28A. The valves 26A, 28A provide conventional communication with a gas supply 30.

The water heater 12 is sequenced through its operational modes in response to a demand signal. When heating is required, the OFF mode is terminated with opening of the pilot valve 26A and ignition of the pilot burner assembly 26 via the sparker 26B; such ignition begins the PILOT-ON mode. After a time, the presence of the pilot flame enables the main valve 28A to be opened and the main burner assembly 28 to be ignited; that ignition marks initiation of the ON mode. Upon satisfaction, both valves 26A, 28A are closed, returning the water heater 12 to the OFF mode, such that fuel is no longer consumed.

The control 10 includes a storage device 32, a controller or microcontroller 34 and a thermo-electric assembly 36, interconnected as shown in FIG. 2. In this preferred embodiment, the storage device 32 is a conventional battery or an equivalent thereof. The control 10 and water heater 12 are powered only by a storage device 32 during the OFF mode. That is, the storage device 32 powers the demand recognition assembly 24, pilot valve 26A and sparker 26B. It is to be understood, however, that the present invention is equally applicable to a heating system powered by conventional electricity when available and powered by the storage device 32 during an interruption.

The storage device 32 has at least a first measurable, monitorial status parameter, indicative of the condition thereof. In this preferred embodiment, the status parameter is current output voltage.

A suitable controller 34 is the MSP430 product family, available from Texas Instruments, Inc., 12500 TI Boulevard, Dallas, Tex. 75243. The controller 34 is programmed with a need-based protocol for proper sequencing of the water heater 12, as discussed above.

The thermo-electric assembly 36 includes a conventional thermopile 38, or an equivalent thereof, in thermal communication with the pilot and main burner assemblies 26, 28. The thermopile 38 converts heat, generated by the burner assemblies 26, 28 during the PILOT-ON and ON modes, to an electric potential or voltage. In this preferred embodiment, the thermo-electric assembly 36 furthers includes a DC-to-DC converter 40, interposed the microcontroller 34 and thermopile 38, to enhance the produced potential. The converter 40, functionally coupled to the thermopile 38, is thermally isolated from the burner assemblies 26, 28.

As a part of sequencing the water heater 12, the controller 34 is interconnected to and powered by the storage device 32. In response to a heating demand from the demand recognition assembly 24, the controller 34 interconnects, either conventionally through the controller 34 itself or through conventional gate circuitry (not shown), the pilot burner assembly 26, including the pilot valve 26A and sparker 26B, and storage device 32, which powers ignition to begin the PILOT-ON mode. Thereafter the controller 34 isolates the storage device 32 to preserve its life, and the potential provided by the thermo-electric assembly 36 is appropriately coupled to power the water heater 12 and the controller 34.

In addition to sequencing of the water heater 12 through the OFF mode (which begins with closure of the pilot and main burner assemblies 26, 28 and ends upon ignition of the pilot burner assembly 26), the PILOT-ON mode (which begins with ignition of the pilot burner assembly 26 and ends with ignition of the main burner assembly 28), and the ON mode (which begins with ignition of the main burner assembly 28 and terminates with closure of the pilot and main burner assemblies 26, 28), the controller 34 monitors the status parameter of the storage device 32. The controller 34 is programmed with a status threshold, related to the storage device 32 and representative of a compromised state.

The controller 34 periodically receives the status parameter, in a conventional manner, and compares the received status parameter with the status threshold. Whenever a predetermined relationship exists, indicative of a compromised storage device 32, the controller 34 initiates and maintains the PILOT-ON mode in lieu of the OFF mode, i.e., in the absence of a heating demand. That is, whenever the comparison reveals that the storage device 32 is failing and may not be capable of firing the sparker 26B, the controller 34 alters the sequencing of the water heater 12 to ensure continuous, uninterrupted operation. The water heater 12 is therefore operational, despite a failed or compromised storage device 32, so long as the pilot burner assembly 26 and thermo-electric device 36 are functional. In this regard, any conventional technique for monitoring the status of the storage device 32 may be utilized.

In this preferred embodiment, the control 10 also includes a display 42, coupled to the controller 32. Whenever the predetermined relationship between the status parameter and threshold exists, the controller 32 activates or illuminates the display 42, signaling the need for battery replacement.

In a second preferred embodiment, the storage device 32 is rechargeable, such as a rechargeable battery, capacitor, super-capacitor or an equivalent thereof. (Again, any conventional technique for monitoring the status of the storage device 32 may be utilized.) Here the controller 34 additionally interconnects the storage device 32 and thermo-electric device 36 during the PILOT-ON and ON modes of operation. This allows the potential generated by the thermo-electric device 36 to recharge the storage device 32. This recharging interconnection may be limited to those periods of time when the predetermined relationship between the status parameter and threshold exists.

A similar heating system, utilizing the less efficient PILOT-ON approach discussed above, is described, in detail, in commonly owned patent applications, Ser. Nos. 10/382,303 and 10/382,050, both filed Mar. 5, 2003, and entitled "Method and Apparatus For Power Management" and "Method and Apparatus For Thermal Powered Control" respectively. The teachings thereof are incorporated herein by reference.

While various preferred embodiments have been described herein, it is to be understood that modifications and changes can be made without departing from the true scope and spirit of the present invention, as defined by the following claims, which are to be interpreted in view of the foregoing detailed description.

What is claimed is:

1. A control for a heating system, operable in an OFF mode, an ON mode and a PILOT-ON mode and including a pilot burner assembly, comprising, in combination:

a controller implementing a predetermined need-based protocol, said controller directing said OFF mode in the absence of a heating demand, said controller sequencing said heating system through said PILOT-ON mode and said ON mode in response to a heating demand;

a storage device having at least a first status parameter; and a thermo-electric assembly in thermal communication with said pilot burner assembly; and said controller being coupled to said pilot burner assembly, said storage device and said thermo-electric assembly;

said controller interconnecting said pilot burner assembly and said storage device to initiate said PILOT-ON mode, said storage device powering said pilot burner assembly to terminate said OFF mode, said thermo-electric assembly providing a potential to power said heating system and said controller during said PILOT-ON mode and said ON mode;

said controller storing at least a first status threshold related to said storage device and periodically receiving said first status parameter, said controller maintaining said PILOT-ON mode in lieu of said OFF mode whenever said first status parameter and said first status threshold have a predetermined relationship.

2. A control as claimed in claim 1 wherein said controller isolates said storage device during said PILOT-ON mode and said ON mode.

3. A control as claimed in claim 2 further comprising a display, operatively coupled to said controller, for indicating whenever said predetermined relationship exists.

4. A control as claimed in claim 1 wherein said controller interconnects said storage device and said thermo-electric assembly whenever said predetermined relationship exists, said potential recharging said storage device.

5. A control as claimed in claim 4 further comprising a display, operatively coupled to said controller, for indicating whenever said predetermined relationship exists.

* * * * *